(12) United States Patent
Kang et al.

(10) Patent No.: US 8,281,153 B2
(45) Date of Patent: Oct. 2, 2012

(54) METHOD FOR INDEXING ENCRYPTED COLUMN

(75) Inventors: Hee-Chang Kang, Seoul (KR); Dae-Won Mun, Seongnam-si (KR); Yu-ho Kim, Seoul (KR)

(73) Assignee: Eglobal System Co. (KR)

( * ) Notice: Subject to any disclaimer, the term of this patent is extended or adjusted under 35 U.S.C. 154(b) by 678 days.

(21) Appl. No.: 12/444,543

(22) PCT Filed: Sep. 28, 2007

(86) PCT No.: PCT/KR2007/004741
§ 371 (c)(1),
(2), (4) Date: Apr. 6, 2009

(87) PCT Pub. No.: WO2008/041810
PCT Pub. Date: Apr. 10, 2008

(65) Prior Publication Data
US 2010/0169665 A1  Jul. 1, 2010

(30) Foreign Application Priority Data
Oct. 4, 2006  (KR) .................. 10-2006-0097710

(51) Int. Cl.
*G06F 21/00*  (2006.01)

(52) U.S. Cl. .................. 713/189; 707/752; 707/753

(58) Field of Classification Search .................. 713/189, 713/193, 165, 167; 707/693, 711, 753
See application file for complete search history.

(56) References Cited

U.S. PATENT DOCUMENTS

| 6,094,649 | A | 7/2000 | Bowen et al. |
| 7,024,414 | B2 | 4/2006 | Sah et al. |
| RE40,694 | E * | 3/2009 | Davis ........................ 713/189 |
| 2008/0082834 | A1 * | 4/2008 | Mattsson .................... 713/189 |

FOREIGN PATENT DOCUMENTS

| JP | 2005-134990 | 5/2005 |
| KR | 10-2001-0056171 A | 7/2001 |
| KR | 10-2006-0087103 A | 8/2006 |

OTHER PUBLICATIONS

Auval Elovici, Ronen Waisenberg, Erez Shmuel and Ehud Gudes, A Structure Preserving Database Encryption Scheme 2004.*

* cited by examiner

*Primary Examiner* — Jung Kim
*Assistant Examiner* — Ghodrat Jamshidi
(74) *Attorney, Agent, or Firm* — The Farrell Law Firm, P.C.

(57) ABSTRACT

The present invention relates to a method of creating indexes so that an index scan can be worked for columns in a database encrypted by means of secrete key cipher algorithm. The method of creating indexes according to the present invention comprises the steps of: re-encrypting to be able to maintain the sort ordering based on a plain text; creating new indexes based on the re-encrypted data; and configuring domain index architecture of encrypted columns so that the created index is used for the index scan in a query statement.

1 Claim, 5 Drawing Sheets

[Fig. 1]

Table-Employee

| Row number | Employee number | Name | Position |
|---|---|---|---|
| AAAN9hAAGAAAAUGAAA | 200403001 | Lee Mong Ryong | Assistant Manager |
| AAAN9hAAGAAAAUGAAB | 200609056 | Sung Chun Hyang | Staff |
| AAAN9hAAGAAAAUGAAC | 198701013 | Go Ju Mong | Director |
| AAAN9hAAGAAAAUGAAD | 199812046 | Lim Gguk Jung | General Manager |
| AAAN9hAAGAAAAUGAAE | 200305094 | Hong Gil Dong | Manager |

101

109

Index-Employee number

| Row number | Employee number |
|---|---|
| AAAN9hAAGAAAAUGAAC | 198701013 |
| AAAN9hAAGAAAAUGAAD | 198812046 |
| AAAN9hAAGAAAAUGAAE | 200305094 |
| AAAN9hAAGAAAAUGAAA | 200403001 |
| AAAN9hAAGAAAAUGAAB | 200609056 |

▶ Select * from Employee where Employee number = '198701013';

Explain Plan

▥ Data Grid  ▤ Explain Plan  ⌬ DBMS Output(disabled)  ▤ Query Viewer  ✺ Script

| Operation | Object Name | Rows | Bytes |
|---|---|---|---|
| ⊟ SELECT STATEMENT Optimizer Mode =CHOOSE | | | |
| ⊟ TABEL ACCESS BY INDEX ROWID | DEMO. Employee | | |
| INDEX RANGE SCAN | DEMO. Employee_Employee number_Index | | |

203

[Fig. 3]
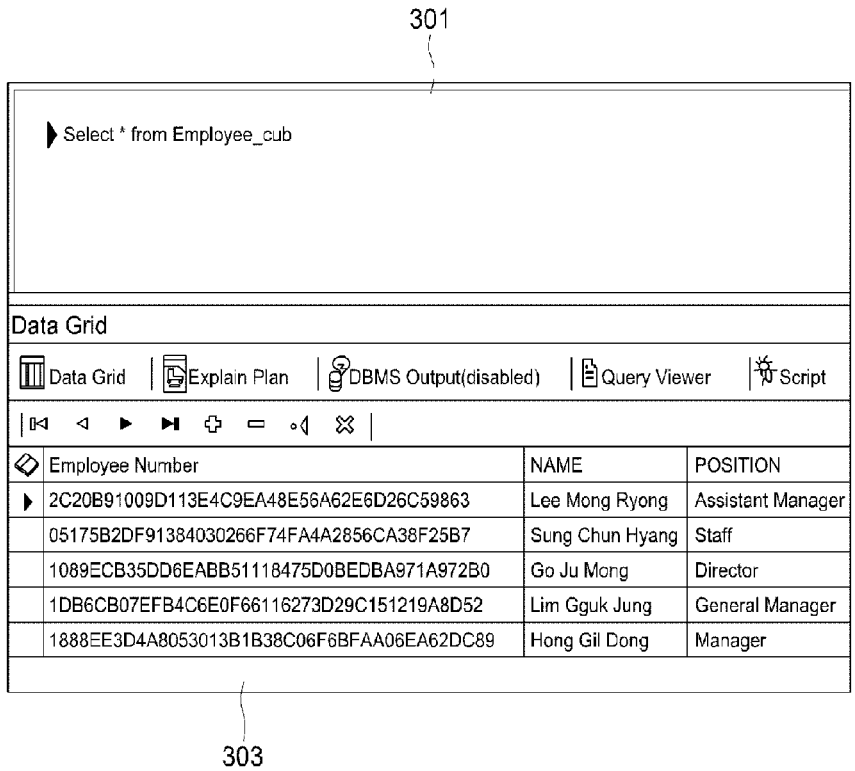
[Fig. 4]
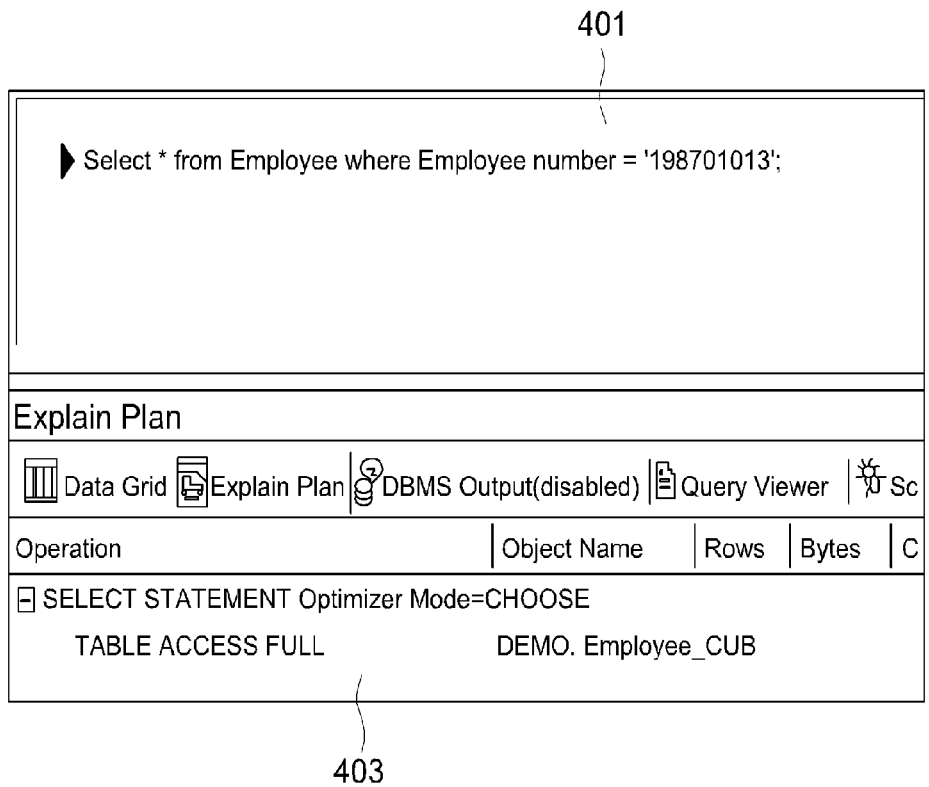

[Fig. 5]
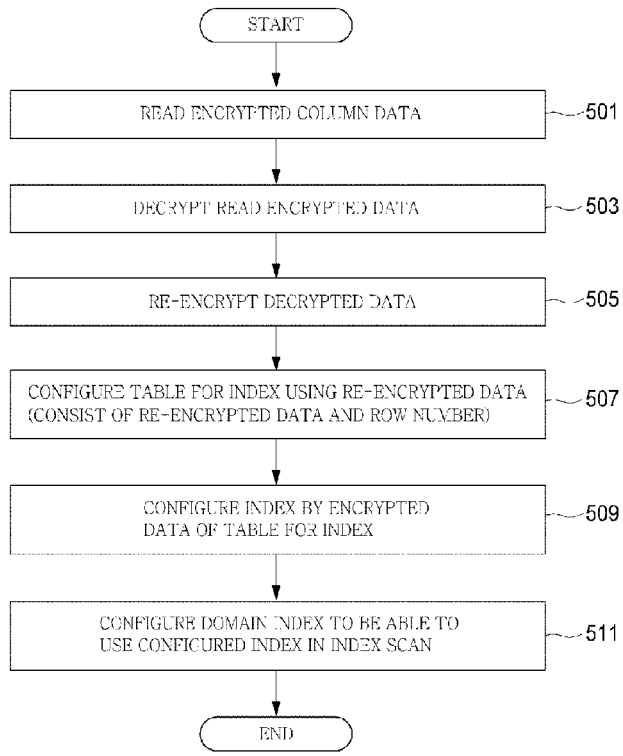
[Fig. 6]
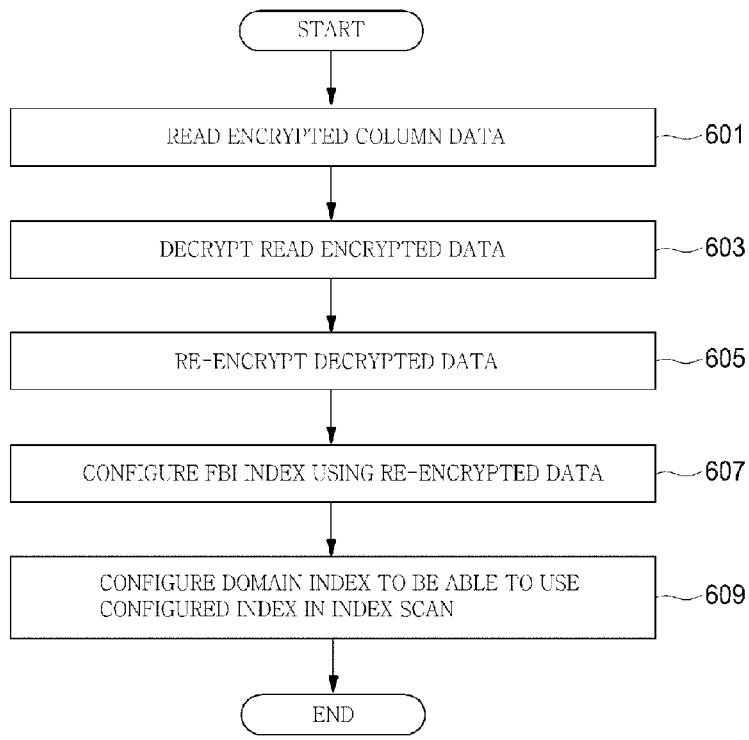

[Fig. 7]
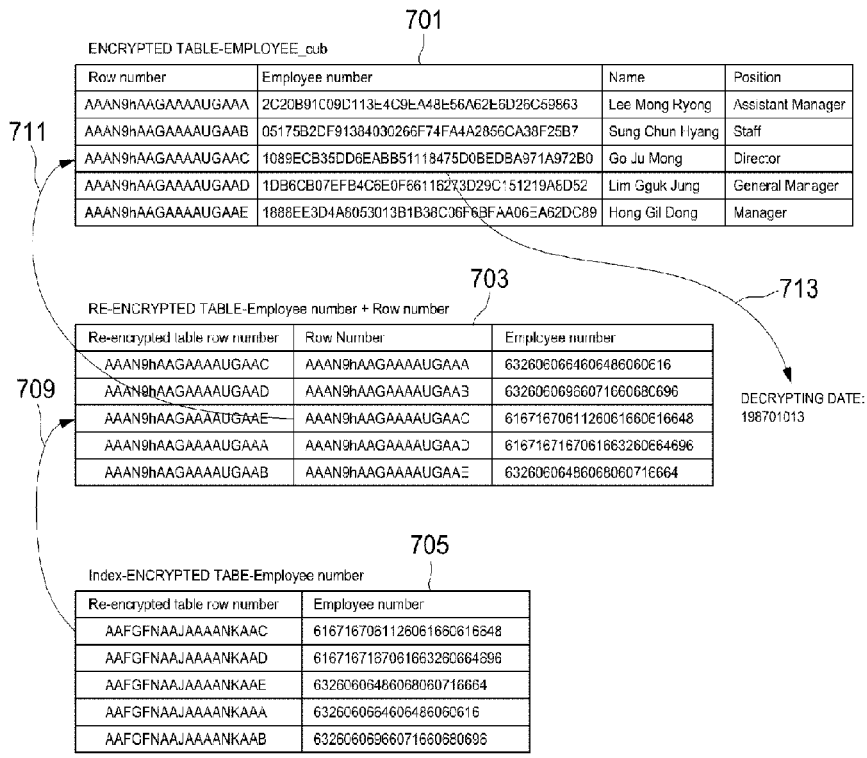
[Fig. 8]
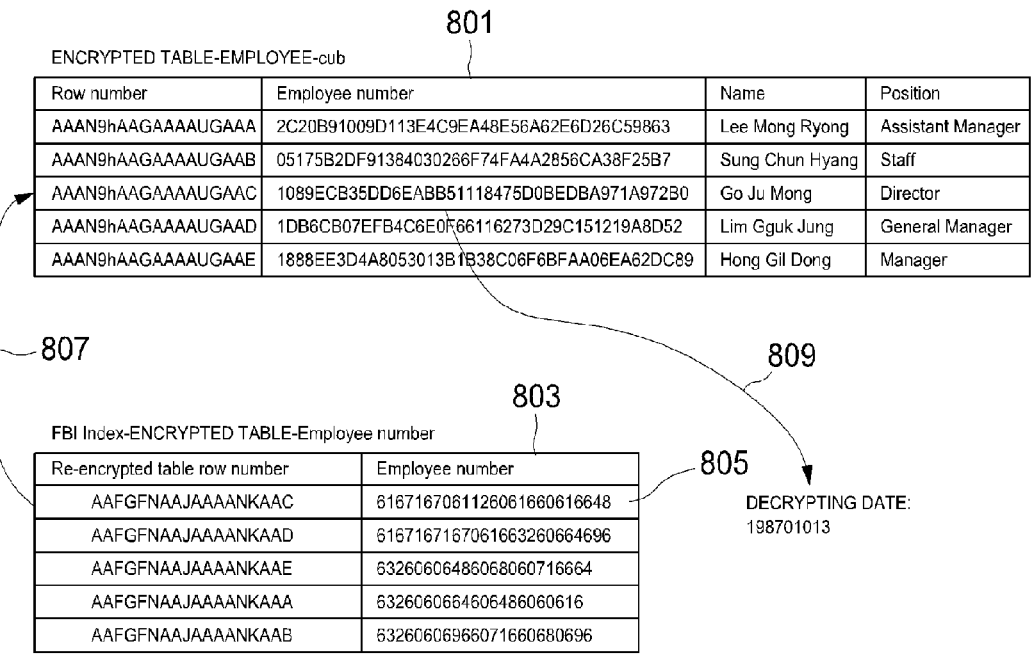

[Fig. 9]

> Select * from Employee_1 where Employee number ='198701013';

Explain Plan

| ⬚ Data Grid 🗐 Explain Plan 🜲 DBMS Output(disabled) 🗐 Query Viewer ☼ Script Debu |
|---|

| Operation | Object Name | Rows | Bytes | Cost |
|---|---|---|---|---|
| ⊟ SELECT STATEMENT Optimizer Mode=CHOOSE | | | | |
|     TABLE ACCESS FULL | DEMO. Employee_1_CUB | | | |

[Fig. 10]

○ Desc Employee_1
> Select * from Employee_2 where Employee number = '198701013";

Explain Plan

| ⬚ Data Grid 🗐 Explain Plan 🜲 DBMS Output(disabled) 🗐 Query Viewer ☼ Script Debugger 🗐 CodeXpert 🗐 S |
|---|

| Operation | Object Name | Rows | Bytes | Cost | Object |
|---|---|---|---|---|---|
| ⊟ SELECT STATEMENT Optimizer Mode=CHOOSE | | 1 | | 3.425207409046 | |
|   ⊟ TABLE ACCESS BY INDEX ROWID | DEMO.Employee_2_CUB | 1 | 30 | 3.425207409046 | |
|       DOMAIN INDEX | XSERVER.Employee number 13356231 IX | | | | |

METHOD FOR INDEXING ENCRYPTED COLUMN

PRIORITY

This application is a National Phase Entry of PCT International Application No. PCT/KR2007/004741, which was filed Sep. 28, 2007, and claims priority to Korean Patent Application No. 10-2006-0097710, which was filed in the Korean Industrial Property Office on Oct. 4, 2006, the content of each of which is incorporated herein by reference.

FIELD OF THE INVENTION

The present invention relates to a method capable of creating an index for an encrypted column and smoothly performing an index scan using the created index.

DESCRIPTION OF THE RELATED ART

The purpose of database is to store a large amount of data and to search the data through desired search conditions easily and rapidly. Because the search speed has an absolute effect on the performance of application programs using the stored data, the efforts to improve the search performance have been devoted since the advent of concept of the database. An ISAM (Indexed Sequential Access Method) file, which is considered to be the beginning database, has used the indexes in order to achieve the quick search; and the efforts to improve the search performance have been continued even recently commercialized RDBMS (Relational Database Management System). Almost all efforts to improve the search speed are focused on the index.

The creation of the index means the sequential re-arrangement of the column data.

As shown in FIG. 1, we know that it shows a method in order to improve the search performance using an index. In other words, as creating an index for employee numbers of a table 101 having employee information, it makes possible for the quick search when it is searched by the employee numbers. An index-employee number 103 stores employee numbers with sorting; and stores row numbers of the table 101 corresponding to each employee numbers. When searching for the specific employee number 198701013 105, the employee numbers are already sorted, thus it makes possible to search a corresponding information rapidly through a B-Tree index scan and to see row number 107 corresponding to the found employee number. As comparing 109 the row number having the row number such as the row number 107 with the table 101, all the desired information can be rapidly searched. As applying these methods, this makes to improve the search performance. As shown in FIG. 2, after creating the indexes using the employee numbers, if the scan is performed 201 using the index numbers as the scan condition, then now we can see an execution plan which is performed 203 the index scan by means of the created indexes.

According to the cardinality of data, various index techniques have been used. At present, the B-Tree is well-known as the fastest index structure. In addition, a Bitmap index has been used when the cardinality is less; and a FBI (Function Based Index) technique using the processed data has been often used.

Generally, it has been known that the implementation of creating the traditional index for the encrypted column is impossible. The basic premise for creating the indexes is a data sort. When the data are encrypted, a sort ordering with a plain text (original data prior to being encrypted) is changed so that even though the indexes are created by the encrypted data, the search result values are varied. As a result, the creation of the indexes by the encrypted data is meaningless. Furthermore, if an IV (Initial Vector) is applied in order to remove the possibility to analogize the encrypted data, the creation of the indexes for the cipher text data is meaningless because there is no one-to-one relation between a plain text and a cipher text. As shown in FIG. 3, it shows the data in the encrypted table 301, however the encrypted data as shown in column of the employee number is not only grasped the meaning but also the sort ordering at all. As shown in FIG. 4, it shows search results after configuring the employee number columns of the encrypted table by means of the traditional index. In other words, as the scan result 401 through the VIEW 'employee' in order to utilize the encrypted table 'employee_CUB' only a full table scan 403 can be performed without performing the index scan even though the index is configured.

For reasons of these limitations, a plain text decrypted from a cipher text is used for indexing on some database encryption products. However, in this case, the plain text is stored, which means there are serious security problems are exists.

SUMMARY OF THE INVENTION

In order to solve the foregoing problems, an object of the present invention is to provide a method improving search performance by creating an index without damaging the security for an encrypted column.

Another object of the present invention is to provide a method capable of using a query sentence that has been used prior to the encryption without modifying it, even in the case where an index scan for an encrypted column is supported.

In order to accomplish the objects, a technical feature of the present invention is that a database to store a table having encrypted columns, a method of configuring indexes for the encrypted columns comprising the steps of: (a) reading a encrypted column data from the table; (b) decrypting the read encrypted column data; (c) re-encrypting the decrypted column data to be able to maintain a sort ordering based on a plain text from the decrypted column data; (d) storing the re-encrypted column data in a table for indexes which is used by a domain index architecture; (e) creating indexes of re-encrypted column of the table; and (f) configuring a domain index which uses the table for the stored index and the stored indexes created in the table for indexes.

The method of mentioned above, wherein the step of (d) storing the re-encrypted column data in a table for indexes which is used by a domain index architecture further comprises the steps of: (d1) creating a table for indexes as a type of a index organized table or a general table with the re-encrypted column data; and (d2) storing the re-encrypted column data in the table for indexes.

The method of mentioned above, wherein the step of (e) creating indexes of re-encrypted column of the table further comprises the steps of: (e1) creating a B-tree index for a column having a re-encrypted column data of the table for the stored indexes; and (e2) creating an index type from a re-encrypted index to a function based index for the column stored the re-encrypted column data.

The method for configuring indexes of the encrypted column according to the present invention can be performed by one of two procedures as shown in FIGS. 5 and 6.

According to the present invention, the index for the encrypted column can be created and the search performance for the encrypted column can be remarkably raised by performing the index scan.

Furthermore, according to the present invention, a method capable of performing the index scan while maintaining the independence of the application programs is provided, irrespective of a match search, a front match search, and a range search, etc.

BRIEF DESCRIPTION OF THE DRAWINGS

The above and other aspects, features, and advantages of certain embodiments of the present invention will be more apparent from the following detailed description taken in conjunction with the accompanying drawings, in which:

FIG. 1 is an exemplary view for an operating structure of a traditional index scan;

FIG. 2 is an exemplary view for an execution plan according to a traditional index scan;

FIG. 3 is an exemplary view for explaining a feature of an encrypted data;

FIG. 4 is an exemplary view for a case where an index is not supported for the encrypted data;

FIG. 5 is a flow chart representing the steps to be possible an index configuration and an index scan for an encrypted column according to an example embodiment of the present invention;

FIG. 6 is a flow chart representing the steps to be possible an index configuration and an index scan for an encrypted column according to another example embodiment of the present invention;

FIG. 7 is an exemplary view illustrating an index scan procedure and a result after configuring an index according to the method of FIG. 5;

FIG. 8 is an exemplary view illustrating an index scan procedure and a result after configuring an index according to the method of FIG. 6;

FIG. 9 is an exemplary view for an execution plan in a case where an index is not supported; and FIG. 10 is an exemplary view for an execution plan in a case where an index is supported.

DETAILED DESCRIPTION OF EMBODIMENTS OF THE INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Referring to FIG. 5, the encrypted data of the encrypted columns are read 501 and the read data are decrypted 503. This is to perform 505 the re-encryption based on the plain text. There are two reasons to re-encrypt the decrypted plain text. One of them is to obtain a sort ordering based on the plain text. The sort ordering is based on the decrypted plain text since the sort ordering of the encrypted data is meaningless. The other of them is re-encryption not to store the plain text. This is to prevent the degradation of security due to the stored plain text by creating a table for indexes based on the re-encrypted data. The content of data stored for the indexes cannot be seen through a general query sentence. However, its content can be seen without limit by directly reading the block of the storage so that the decrypted plain text or the original plaintext should not be considered as the criterion of the indexes. Therefore, the re-encryption process 505 is an essential step. Based on the sort ordering and the security acquired in the re-encryption process 505, the table for indexes is configured 507 using the re-encrypted data. The table for indexes is configured in an index organized table form or a general table form that is configured of two columns, that is, one column being the re-encrypted data or the other column being a row number of the encrypted original table. The preferred embodiment has the general table form that has the re-encrypted data and the row number of the original encryption table. The preferred embodiment can have the IOT (Index Organized Table) form that has the re-encrypted data and the row number of the original encryption table. However, it is confirmed that the general table form is much better in view of the scan performance, as compared to the IOT form. Therefore, the following description is based on the table storing the re-encrypted data and the row number or the original encryption table in the general table form.

In order to support the index scan based on the encrypted column on performing the query sentence, the index is created 509 based on the column with the re-encrypted data for the table having the re-encrypted data and the row number of the original encryption table. As shown in FIG. 2, this is to perform the index scan 203 on performing the query sentence.

In the preferred embodiment, the processes 501, 503, 505, and 507 from reading the encrypted column to configuring the table for indexes using the re-encrypted data are performed in a single procedure. At this time, the used technique is an external procedure call. FIG. 7 shows the results configuring the indexes by the encrypted data in the table for indexes.

FIG. 7 shows what the index scan for the encrypted data looks like. There are the encrypted data and the row number in a table 701 having the encrypted data. There are the re-encrypted data and the row number of the encrypted table 701 and the row number of the table having the re-encrypted data in a table 703 having the re-encrypted data. An index 705 for the re-encrypted column of the re-encrypted table 703 has the re-encrypted data and the row number of the re-encrypted table 703.

When performing the search using the employee numbers, the corresponding employee number is found from the index of the re-encrypted table. At this time, the index is configured to perform the index scan so that the corresponding data can be rapidly found 707. If the desired data are found in the index with the re-encrypted table, the row number of the corresponding re-encrypted table is immediately found. The corresponding row of the re-encrypted table is immediately found 709 using the row number of the found re-encrypted table so that a primary index scan is completed. There is the row number of the encrypted table 701 in the row found in the re-encrypted table. The corresponding row of the encrypted table is found 711 by using this row number. There is the encrypted employee number in the row found in the encrypted table. If the encrypted employee number is decrypted 713, the desired results can be finally obtained.

FIG. 6 shows another procedure capable of implementing an indexing for an encrypted column of the present invention. The description thereof will be described below.

As shown in FIG. 6, the encrypted data of the encrypted column are read 601 and the read data are decrypted 603. This is to perform 605 the re-encryption based on the plain text. There are two reasons to re-encrypt the decrypted plain text. One of them is to obtain a sort ordering based on the plain text. The sort ordering is based on the decrypted plain text since the sort ordering of the encrypted data obtains is meaningless.

The other of them is re-encryption not to store the plain text. This is to prevent the degradation of security due to the stored plain text by creating a table for indexes with the re-encrypted data. The content of data stored for the indexes cannot be seen through a general query sentence. However, its content can be seen without limit by directly reading the block of the storage so that the decrypted plain text or the original plain text should not be considered as the criterion of the indexes. Therefore, the re-encryption process 605 is an essential step. Based on the sort ordering and the security acquired in the re-encryption process 605, an FBI (Function Based Index) for the encrypted table is configured 607 using the re-encrypted data. The FBI configured using the re-encrypted data configures the re-encrypted data in a column. Internally viewing the database, the index configured of the sorted re-encryption data column and the row number of the encrypted table is configured. In the preferred embodiment, In order to support the index scan based on the encrypted column on performing the query sentence, the index scan for the FBI having the re-encrypted data and the row number of the original encryption table is performed. As shown in FIG. 2, the index scan 203 is performed on performing the query sentence.

In the preferred embodiment, the processes 601, 603, 605, and 607 from reading the encrypted column to configuring the FBI using the re-encrypted data are performed in a single procedure. At this time, the used technique is an external procedure call. FIG. 8 shows the results configuring the indexes by the encrypted data in the table for indexes.

FIG. 8 shows how the index scan for the encrypted data works. There are encrypted data and row numbers in a table 801 having the encrypted data. The FBI 803 having the re-encrypted data has the re-encrypted data and the row numbers of the encrypted table 801.

When performing search by employee numbers, the corresponding employee number is found from the FBI (Function Based Index) of the encrypted table. At this time, the indexes are configured to perform the index scan so that the corresponding data can be rapidly found 805. If desired data are found in the FBI for the re-encrypted table, the row number of the corresponding encrypted table is immediately retrieved 807. There is the encrypted employee number in the row found in the encrypted table. If the encrypted employee number is decrypted 809, the desired results can be finally obtained.

According to another aspect of the present invention, a method capable of performing a database optimizer without changing a query statement for index scan of the encrypted column uses a domain index. The encrypted table is not indicated on the query statement as it is and accesses through a VIEW. This is to enable the decrypting process for the encrypted data to use the external procedure call. However, when a "where" clause is included in the query statement and there are the terms for the encrypted column in the "where" clause, all the encrypted columns are decrypted as defined in the VIEW and then compared with the scan conditions defined in the "where" clause. As a result, even though the index scan is intended to be performed, all the encrypted column data should be unconditionally decrypted. Accordingly, in the case of the foregoing situation, that is, in the case where the "where" clause is included in the query statement and the scan conditions for the encrypted column is specified in the "where" clause, the query statement should be automatically reconfigured so that the prepared indexes should be used. In the present invention, the query statement is automatically changed using the domain index architecture so that the configured index will be used.

FIG. 9 shows the generation of the scan for all the data without automatically changing the query statement even though the index for the encrypted column is configured.

FIG. 10 shows a configuration of the index for the encrypted column and the performance of the domain indexing through the VIEW after applying the automatic change of the query statement in accordance with the preferred embodiment of the present invention. Therefore, the independence of the application programs is kept according to the index configuration for the encrypted column and the automatic change of the "where" clause as well as the scan search can be made prior to the encryption by applying the index scan.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

The invention claimed is:

1. In a database to store a table having encrypted columns, a computer implemented method of configuring indexes for the encrypted columns comprising the steps of:
   (a) reading an encrypted column data from the table;
   (b) decrypting the read encrypted column data;
   (c) re-encrypting the decrypted column data to be able to maintain a sort ordering based on a plain text from the decrypted data;
   (d) storing, in the computer, the re-encrypted column data in a table for indexes which is used by a domain index architecture
   (e) creating indexes according to the sort ordering based on the plain text from the decrypted data of a re-encrypted column of the table for indexes; and
   (f) configuring a domain index which uses the table for indexes and the indexes created in the table for indexes.

* * * * *